(12) United States Patent
Rodriguez et al.

(10) Patent No.: US 9,366,182 B2
(45) Date of Patent: Jun. 14, 2016

(54) INTEGRATED ELECTRICAL POWER AND THERMAL MANAGEMENT SYSTEM

(71) Applicant: Rolls-Royce Corporation, Indianapolis, IN (US)

(72) Inventors: Rigoberto J. Rodriguez, Avon, IN (US); William L. Siegel, Mercersburg, PA (US)

(73) Assignee: Rolls-Royce Corporation, Indianapolis, IN (US)

( * ) Notice: Subject to any disclaimer, the term of this patent is extended or adjusted under 35 U.S.C. 154(b) by 32 days.

(21) Appl. No.: 14/546,622

(22) Filed: Nov. 18, 2014

(65) Prior Publication Data
US 2015/0159552 A1 Jun. 11, 2015

Related U.S. Application Data

(60) Provisional application No. 61/912,962, filed on Dec. 6, 2013.

(51) Int. Cl.
| | |
|---|---|
| *B60L 1/02* | (2006.01) |
| *F01K 15/00* | (2006.01) |
| *F02C 6/18* | (2006.01) |
| *F02C 7/12* | (2006.01) |
| *F02C 7/32* | (2006.01) |
| *F01D 15/10* | (2006.01) |
| *F02C 1/00* | (2006.01) |

(52) U.S. Cl.
CPC ... *F02C 6/18* (2013.01); *F02C 7/12* (2013.01); *F02C 7/32* (2013.01); *B64D 2221/00* (2013.01); *F05D 2220/76* (2013.01); *F05D 2260/20* (2013.01); *Y02T 50/675* (2013.01)

(58) Field of Classification Search
USPC .......................................... 290/2, 52; 60/772
See application file for complete search history.

(56) References Cited

U.S. PATENT DOCUMENTS

| | | | | |
|---|---|---|---|---|
| 4,510,756 | A * | 4/1985 | Hise | F24D 11/00 237/12.1 |
| 4,752,697 | A * | 6/1988 | Lyons | F01K 17/02 290/2 |
| 5,121,598 | A | 6/1992 | Butler | |
| 5,536,976 | A * | 7/1996 | Churchill | H02G 1/1256 290/4 A |
| 5,731,688 | A * | 3/1998 | Thomson | H02J 3/38 290/40 B |
| 5,734,255 | A * | 3/1998 | Thompson | H02J 3/38 290/2 |
| 5,867,979 | A | 2/1999 | Newton et al. | |

(Continued)

OTHER PUBLICATIONS

Search Report for EP Application No. 14195426.3, dated Apr. 29, 2015, 3 pages.

*Primary Examiner* — Pedro J Cuevas
(74) *Attorney, Agent, or Firm* — Fishman Stewart PLLC

(57) ABSTRACT

An electrical power and thermal management system may include a power plant operable to provide power to an electrical generation device. The system may include at least one conversion/distribution assembly configured to provide electrical power to a first electrical bus. The system may also include a thermal management system configured to circulate coolant to at least one heat source. A controller may be in communication with the power plant, the electrical generation device, the conversion/distribution assembly, the electrical power bus, and the thermal management system. The controller may be configured to integrally manage electrical and thermal steady and transient demands, wherein the controller is operable to selectively distribute power to the electrical power bus and regulate produced thermal energy in response to electrical and thermal demands, respectively.

20 Claims, 3 Drawing Sheets

(56) References Cited

U.S. PATENT DOCUMENTS

| | | | |
|---|---|---|---|
| 5,973,481 A * | 10/1999 | Thompson | H02J 3/38 290/2 |
| 6,476,510 B2 | 11/2002 | Soucy | |
| 6,906,432 B2 | 6/2005 | Belokon et al. | |
| 6,931,856 B2 | 8/2005 | Belokon et al. | |
| 7,285,871 B2 | 10/2007 | Derouineau | |
| 7,468,561 B2 | 12/2008 | Kern et al. | |
| 7,605,483 B2 | 10/2009 | Kern et al. | |
| 7,936,086 B2 | 5/2011 | Yue et al. | |
| 8,039,983 B2 | 10/2011 | Cote et al. | |
| 8,164,208 B2 | 4/2012 | Rosson et al. | |
| 8,286,432 B2 | 10/2012 | Anson | |
| 8,304,927 B2 | 11/2012 | Cote et al. | |
| 8,395,274 B2 * | 3/2013 | Nelson | H02J 15/00 290/52 |
| 8,967,531 B2 * | 3/2015 | Gagne | B64D 13/006 244/58 |
| 9,156,560 B2 * | 10/2015 | Burns | B64D 31/14 |
| 2008/0211230 A1 * | 9/2008 | Gurin | B60L 11/1861 290/2 |
| 2012/0247117 A1 | 10/2012 | Gagne et al. | |
| 2012/0248242 A1 | 10/2012 | Gagne et al. | |
| 2013/0111917 A1 | 5/2013 | Ho et al. | |
| 2015/0005990 A1 * | 1/2015 | Burns | B64D 31/14 701/3 |
| 2015/0143806 A1 * | 5/2015 | Friesth | F03G 7/04 60/517 |
| 2015/0151848 A1 * | 6/2015 | Gagne | B64D 13/006 244/58 |

* cited by examiner

INTEGRATED ELECTRICAL POWER AND THERMAL MANAGEMENT SYSTEM

CROSS-REFERENCE TO RELATED APPLICATIONS

This application claims priority to U.S. Provisional Patent Application No. 61/912,962 filed Dec. 6, 2013, the contents of which are hereby incorporated in their entirety.

FIELD OF TECHNOLOGY

An improved integrated design and control of a gas turbine is disclosed. More particularly, performance and efficiency are improved by optimizing size and usage of components of a gas turbine, the components including propulsion, thermal, electrical, and control systems, as examples. The improvements are applicable to turbines used for propulsive power in marine, land, air, and underwater applications, as examples.

BACKGROUND

It has become increasingly desirable to improve the overall system design and operation of gas turbines. In a system having a typical gas turbine engine, electrical power is extracted via an electrical generator to supply electrical power to control systems, actuators, weapons systems, climate control systems, and the like. Electrical storage, such as a battery, is typically provided to operate such systems when the gas turbine engine is not running or to provide power for starting the gas turbine engine. In some known gas turbine engines, the gas turbine engine includes a high pressure shaft and a lower pressure shaft, and the electrical generator is coupled to one of the high and low pressure shafts.

However, extraction of power from the gas turbine engine via one of the shafts itself typically results in a loss in overall system life, and in particular to the components of the engine to which the electrical generator is coupled.

Overcoming these concerns would be desirable and could save the industry substantial resources.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine and schematic of an electrical system coupled thereto are described herein and are shown in the attached drawings. The electrical system includes at least two generator circuits, one coupled to a high pressure portion of a gas turbine engine and the other coupled to a tow pressure portion of the gas turbine engine.

Figure 1:
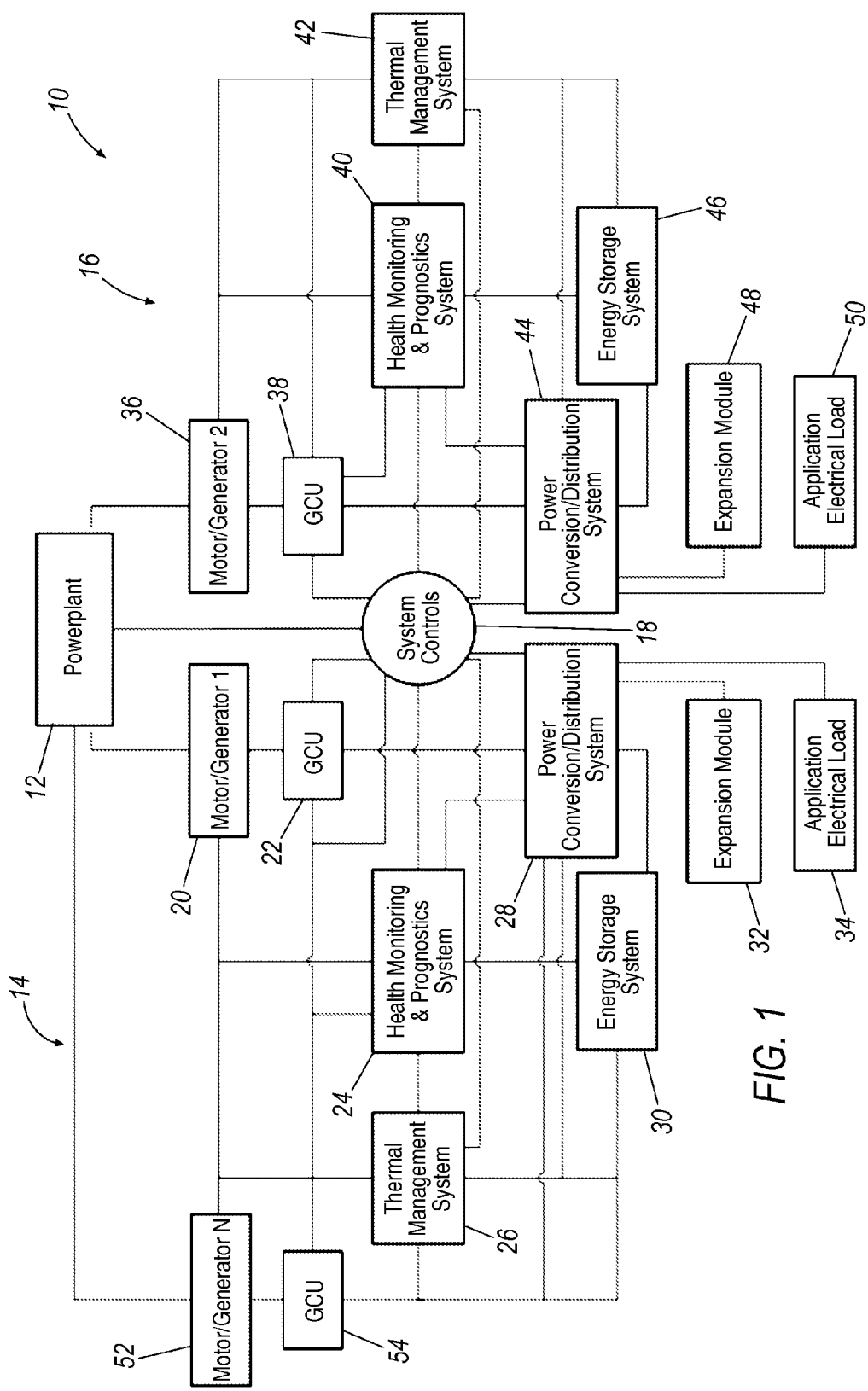
FIG. 1 is a schematic illustration of an electrical system coupled to a gas turbine engine, according to one example.

FIG. 1 illustrates an electrical system 10 in which a power plant or engine 12, such as a gas turbine engine, provides electrical power to a first power circuit 14 and a second power circuit 16. A system controller 18 is coupled to engine 12 and also to first and second circuits 14, 16. First power circuit 14 includes a motorgenerator 20 and a General Control Unit (GCU) 22 coupled thereto. GCU 22 is also coupled to other components within first power circuit 14, such as a health monitoring and prognostics system 24, a thermal management system 26, and a power conversion/distribution system 28. First power circuit 14 also includes an energy storage system 30, an expansion module 32, and application electrical load(s) 34. System controller 18 is configured to regulate power flow (such as electrical currents and voltages within system 10) to provide power to various electrical busses. The power may be DC, AC, or conversion therebetween. System controller 18 may also be configured to execute computer program instructions to control the operation of engine 12, including fuel flow, or the position of any variable geometry systems (e.g., from the flight control system of an aircraft or from a steering system of a ship).

Health monitoring and prognostics system 24 is generally a unit that monitors the health of system components, and may be used to estimate component life based on sensor feedback received from components within engine 12. Thermal management system 26 includes pumps, expansion valves, and the like, as well as a controller, to provide coolant for the purposes of climate control, and other system operations. Power conversion/distribution system 28 receives electrical power from motor/generator 20 via GCU 22, and converts the power to a more useable form such as a DC voltage for storage in energy storage system 30, expansion module 32, and application electrical load(s) 34. The energy storage system 30 may include a battery or other energy storage system. Energy storage system 30 stores energy for providing power when engine 12 is not running (i.e., not generating power), but also to provide power to motor/generator 20 to provide starting power to engine 112 during startup. Expansion module 32 and application electrical load 34 represent additional electrical components that receive power from power conversion/distribution system 28.

Second power circuit 16 similarly includes a motor/generator 36 and a GCU 38 coupled thereto. GCU 38 is also coupled to other components within second power circuit 16, such as a health monitoring and prognostics system 40, a thermal management system 42, and a power conversion/distribution system 44. Second power circuit 16 also includes an energy storage system 46, an expansion module 48, and application electrical load(s) 50. The components 36-50 of second power circuit 16 are similarly arranged as described with respect to first power circuit 14. Additionally, in one example electrical system 10 includes one or more additional motor/generators 52 and corresponding GCUs 54 as well, which may be coupled to a gas turbine engine as will be further described. Thus, the system 10 is modular and flexible in that it may be expanded to include a number N motor/generators based on contemplated operating conditions.

Figure 2:
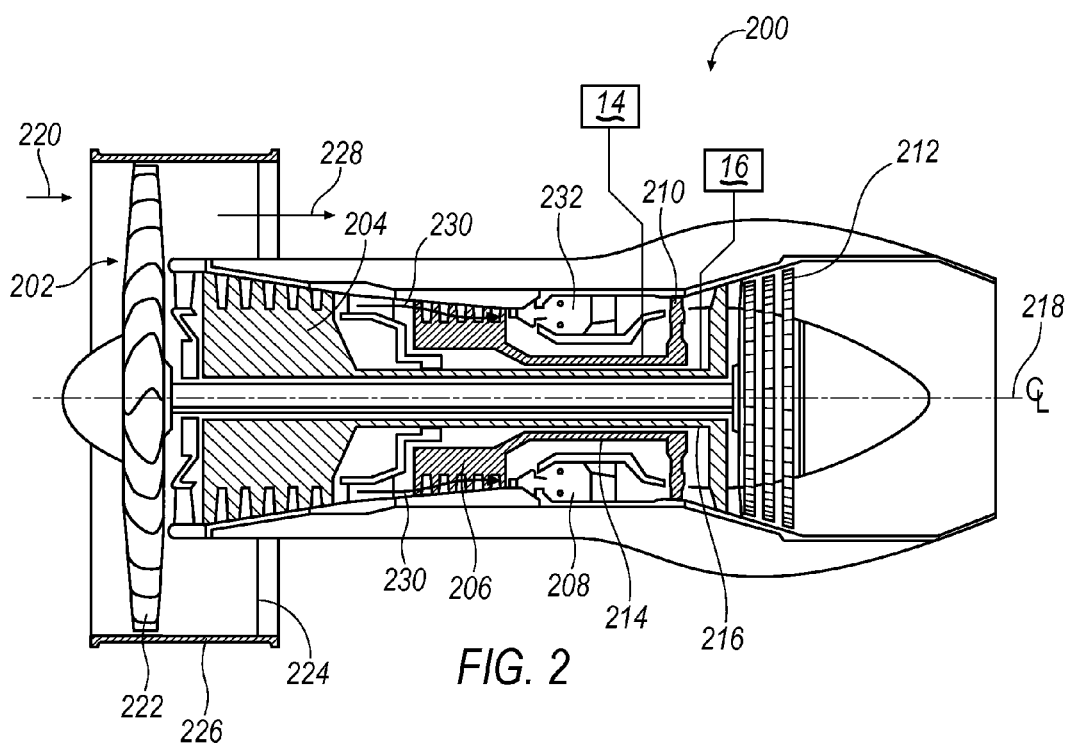
FIG. 2 illustrates an exemplary gas turbine engine that incorporates the electrical system illustrated in FIG. 1.

FIG. 2 illustrates a gas turbine engine 200, which includes a fan 202, a low pressure compressor and a high pressure compressor, 204 and 206, a combustor 208, and a high pressure turbine and low pressure turbine, 210 and 212, respectively. The high pressure compressor 206 is connected to a first rotor shaft 214 while the low pressure compressor 204 is connected to a second rotor shaft 216. The shafts extend axially and are parallel to a longitudinal center line axis 218. Ambient air 220 enters the fan 202 and is directed across a fan rotor 222 in an annular duct 224, which in part is circumscribed by fan case 226. Bypass airflow 228 provides engine thrust while a primary gas stream 230 is directed to a combustor 232 and the high pressure turbine 210.

First and second rotor shafts 214, 216, are coupled, respectively, to first and second power circuits 14, 16, as illustrated in FIG. 1. Thus, first and second power circuits 14, 16 are configured to split power between motor/generators 20, 36 so that each provides a portion of the power demand. As such, a power sharing/transfer arrangement between motor/generators 20, 36 provides the platform power demand, and includes a capability to provide power to one of the shafts 214, 216, as necessary. Such arrangement also provides an ability to optimize load shedding and a demand side management of the power requirement. Thus, life and performance considerations may be taken into account in real-time and optimized to actively seek and obtain performance optima while equipment is in operation.

Figure 3:
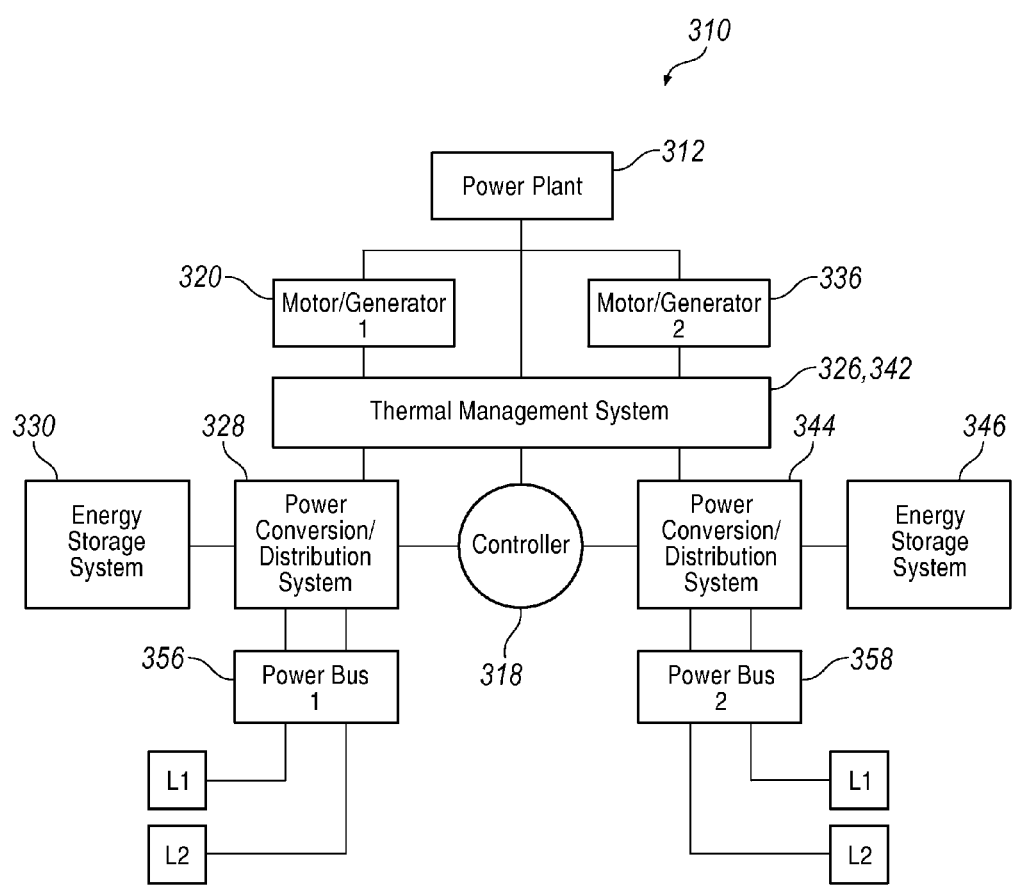
FIG. 3 is a schematic illustration of an electrical power and thermal management system, according to one example.

FIG. 3 illustrates an additional example of the system 10 of FIG. 1. According to one example, an electrical power and thermal management system 310 may include a system controller 318 integrally coupled to multiple systems and subsystems, including, for instance, a thermal management system 326, 342, a power conversion and distribution system 328, 344, and an energy storage system 330, 346. The electrical power and thermal management system 310 may be incorporated into many existing or future applications, including, but not limited to, aircraft, ship, train, and laboratory facilities. The components may perform the same and/or additional functions as those described in reference to FIG. 1.

The exemplary system as illustrated in FIG. 3 may include a controller 318 configured to integrally manage and distribute electrical energy efficiently across the system 310. The controller 318 may be operable to integrally control the electrical power and thermal energy associated with an individual engine, or may manage/distribute energy across a multi-engine platform. The controller 318 may include any computing device configured to execute computer-readable instructions. For example, the controller 318 may include a processor (not shown) and a module (not shown). The processor may be integrated with, or separate from, the controller 318. Alternatively, the controller 318 may include various modules, each configured to communicate with the processor via a gateway module. Additionally or alternatively, the system 310 may include multiple controllers 318, each including a processor and module. The controller 318 may be configured to receive various inputs and generate and deliver various outputs in accordance with the inputs received or computer-executable instructions maintained in a database (not shown.).

In general, computing systems and/or devices, such as the controller 318 and processor may employ any number of computer operating systems. It will be apparent to those skilled in the art from the disclosure that the precise hardware and software of the controller 318 and processor may be any combination sufficient to carry out the functions of the examples discussed herein. Controller 318 may be configured to receive input from various sensors and sensor systems, including, but not limited to, engine performance, thermal management, fuel efficiency, electrical output, etc. The controller 318 may be configured to control and manage the operation of various components of the system 310 in response to detected sensor input.

The controller 318 may be in communication with the thermal management system 326, 342, which may be configured to regulate the available thermal energy efficiently across the system 310. The system 310 may include a single, common thermal management system 326 or 342, or utilize a plurality of thermal management systems 326, 342 as illustrated in FIG. 1. The thermal management system 326, 342 may be configured to circulate coolant throughout the system 310. For example, the thermal management system 326, 342 may include one or more cooling systems configured to handle thermal loads of the system 310. A cooling fluid may be circulated through or in proximity to one or more system 310 components to absorb heat from the said components (e.g., generators 320, 336, power plant 312, power conversion/distribution system 328, 344, weapon systems, etc.). The cooling fluid may be circulated through a heat exchanger (not shown), such as an air cooled heat exchanger, for removal of the heat from the system 310. The cooling fluid may then be circulated through the system and be re-chilled for subsequent use by the thermal management system 326, 342 via a recirculation pump, for example. According to another example, fuel may be used as the appropriate heat sink to extract generated thermal energy from the system 310. Additionally or alternatively, thermal management system 326, 342 may be configured to circulate ambient and/or chilled air, via a refrigerant compressor, for example, throughout the system to extract heat from system 310 components. Furthermore, the thermal management system 326, 342 may use coolant fluid in conjunction with ambient or chilled air to absorb heat generated from system 310 components.

Additionally, the thermal management system 326, 342 may include a thermal energy storage (TES) system configured to store excess thermal energy to be maintained for later use. For example, IFS may be any type of system configured to store and maintain thermal energy, e.g., gases, liquids, solids, and/or eutectic mixtures. As such, heat may be more conveniently balanced between periods of high and low performance demands.

In the example referenced by FIG. 3, the power conversion and distribution systems 328, 344 may be configured to receive electrical power from the motorgenerator 320, 336 and convert the energy to more useable form. That is, the power conversion and distribution systems 328, 344 may provide the systems and sub-systems with various AC and DC voltages via an electric power bus 356, 358. For instance, some electrical systems may utilize AC voltages of 115V or 230V or higher, with fixed frequencies(e.g., 5060 Hz or 400 Hz), or variable frequencies (e.g., 360-800 Hz or 1000-2000 Hz). Similarly, the power conversion and distribution system 328, 344 may utilize DC voltages, such as, for example, 28V, 270V, or ±270V.

The power conversion and distribution system 328, 344 may be configured as a rack or cabinet (e.g., a distribution center) sized to include the maximum possible number of converter boxes for the system 310. Each converter box may be connected to signals, power, and coolant in the distribution center via a similar interface method (e.g., wires, bus bar, hoses). For instance, the power conversion and distribution system 328, 344 may include a backplane with common hardware for the power conversion/distribution system 328, 344, and converter boxes that may be mated with the common hardware (e.g., in a pluggable form). The backplane may include a standardized electrical interface operable for mating the different converter boxes. That is, the backplane may include all hardware common in the power conversion/distribution system 328, 344 and the individual converter boxes may include the equipment and hardware required to perform the function assigned to that converter box.

Additionally or alternatively, the power conversion and distribution system 328, 344 may be modular and programmable to allow the system 310 to be adapted to multiple applications with minimum change. The conversion and distribution system 328, 344 may be configured as a stackable design including a manifold of modular, replaceable, and programmable power electronics modules. The modules may include common hardware (e.g., breakers, coolant, power buses) as well as functional hardware (e.g., inverters, rectifiers, etc.). For instance, the modular functional modules may include any combination of inverters, rectifiers, and voltage and frequency control circuits to power various systems. When stacked or mated, the collection of modules may include both functional as well as common hardware systems. As such, the power conversion and distribution system 328, 344 may be customized and/or formatted in response to measured or anticipated operational electrical loads. Additionally, the modular design enables easy substitution and replacement of the conversion and distribution modules.

The controller 318 may likewise be in communication with the energy storage system 330, 346. The energy storage systems 330, 346 may be bidirectional capable, thereby configured to absorb power from the electrical power buses 356, 358 and selectively supply power to the electrical power buses 356, 358 as managed by the controller 318. For instance, the energy storage systems 330, 346 may be configured to absorb transient loads from the electrical power buses 356, 358. Likewise, the energy storage systems 330, 346 may be configured to provide energy for electrical transients, to handle peak loads, and/or to provide supplemental power to augment load requirements. Additionally or alternatively, the energy storage system 330, 346 may be configured to perform energy storage charging. The energy storage system 330, 346 may be charged by multiple energy sources via the electrical power circuits. That is, the energy storage system 330, 346 may absorb excess electrical loads from the power bus 356, 358 as managed by the controller 318. For instance, the energy storage systems 330, 346 may receive intentional regenerative energy via the motor/generators 320, 336. Moreover, the motor/generators 320, 336 may produce electrical power in excess of that needed by the electrical power buses 356, 358, wherein the energy storage system 330, 346 may absorb the excessive loads thereby charging the electrical storage system 330, 346.

According to one example, the controller 318 may be configured to interconnect multiple power sources together via a common electrical power circuit. The controller 318 may operate independently from, or in conjunction with, the generator control units 22, 38, when managing generator 320, 336 commands. The controller 318, via the power conversion/distribution systems 328, 344, may be configured to connect variable power sources into a single power supply directed to the power bus 356, 358 to meet current load demands. For instance, the controller 318 may be configured to perform multi-shaft 214, 216 power sharing, whereby power may be directed to motorgenerator 320 and/or 336 which provides electrical power to a shared bus network (e.g., power bus 356 and/or 358) at the same time. in addition, the controller 318 may be configured to direct the motor/generators 320 and 336 to split power to electrical power buses 356, 358 at differing levels, thereby yielding variable power sharing. For instance, the controller 318 may direct motor/generators 320 and 336, via the power conversion/distribution system 328, 344 to provide variable power levels to one or more common electrical power buses, such as a power split of 75% of the electrical load being supplied by motor/generator 320 and the remaining 25% of the electrical load being supplied by motorgenerator 336. Further, the controller 318 may be configured to adjust the load split between motorgenerator 320 and 336 in response to current engine operating and electrical load requirements. In one implementation, the total load requirements supplied to the electrical power buses 356, 358 by motorgenerator 320 and 336 may vary inversely and proportionally (e.g., 0-100% by motorgenerator 320 and 100-0% by motorgenerator 336), yielding dynamic variable power sharing.

The controller 318 may be in communication with the power plant 312, operable to draw additional power in response to current load demands. For instance, the controller 318 may be configured to request more fuel so that the engine increases motive power supplied to motor/generators 320, 336. The controller 18 may be configured to coordinate the output of electrical power supplied to the electric power bus 356, 358 depending on various load requirements and may make adjustments to the power output provided by motors/generators 320, 336 in accordance with power requirements. Additionally, the controller 318 may be configured to transfer power between rotor shafts 214 and 216, whereby motive power is transferred from one shaft to the other. That is, the controller 318 may manage and monitor shaft load requirements in order to conserve the useful life (e.g., reduce wear and/or stress) on the shafts 214, 216. Additionally or alternatively, in a multi-engine platform power transfer may include transferring shaft power from one or more shafts/spools of one engine to one or more shafts/spools of one or more other engines. Power transfer between engine shafts 214, 216 may increase the useful life of engine equipment (e.g., rotor shafts, compressor outlet blades, etc.), and may be desirable during aggressive aircraft maneuvers or during high powered electrical power take-off, for example, The controller 318 may prioritize the energy source for thermal and electrical steady state and transient demands and manage the power conversion/distribution system 328, 344 to meet the demands. Electrical transients circulated through a power bus network resulting from electrical loads supplied with power via electrical buses 356, 358 may have an adverse impact on components in the system 310 (e.g., generators, rotor shafts, etc.). The controller 318 may be configured to integrally combine various electrical and thermal systems and sub-systems to manage these demands. The controller 318 may coordinate the electrical power supplied by motor/generators 320, 336 and the energy storage systems 330, 346. For instance, the controller 318 may draw power from the energy storage system 330, 346 to provide power for electrical transients. Likewise, the energy storage system 330, 346, at the direction of the controller 318, may absorb transient loads from the electric power bus 356, 358, thereby reducing or eliminating the adverse impact of electrical transients. Indeed, by virtue of the energy storage system 330, 346, electrical power may be maintained and used during times where it would be disadvantageous to extract power from the power plant 312 through one or both motor/generators 320, 336 (e.g., during high thrust conditions).

Moreover, the controller 318 may be configured to circulate coolant through the system 310 in response to increased operating temperatures. For example, the controller 318 may increase coolant supplied to one or more motor/generators 320, 336 to increase output and/or manage equipment life. Likewise, the controller 318 may direct the thermal management system 326, 342 to circulate coolants throughout the system 310 to extract heat from system 310 components (e.g., power conversion/distribution system 328, 344, motor/generators 320, 336, power plant 312, energy storage systems 330, 346, etc.). Additionally, the controller 318 may be operable to dump excess thermal loads into the appropriate heat sink(s) available and/or discharge and store excess thermal energy in the TES system incorporated within the thermal management system 326, 342. Thus, the controller 318 may efficiently store and extract thermal energy from the TES system based on thermal load requirements. The controller 318 may likewise manage the thermal energy generated by the system 310 components by selectively activating and deactivating components in response to operating temperatures. For instance, the controller 318 may alternate activation of rotor shaft 214 and 216 to supply motive power to motor/generators 320, 336 in response to detecting increased temperatures generated by one shaft over the other. Likewise, the controller 318 may draw power from the energy storage system 330, 346 rather than motor/generator 320, 336 in response to rising operating temperatures of the motorgenerator 320, 336 (e.g., to reduce the work load of motor/generator 320, 336, thereby reducing the amount of heat produced).

The controller 318 may manage the electrical loads and the distribution of power via the power conversion/distribution system 328, 344. The controller 318 may manage the amount of electrical power supplied to power bus 356 and 358. The controller 318 may prioritize the electrical loads and power distribution demands by deactivating non-essential loads or varying electrical power distributed to low priority loads for periods of time, for instance, to meet other transient load demands. The controller 318 may assign a priority level so that it is associated with a plurality of electrical loads, wherein the priority levels may be based at least in part on transient load demands and/or electrical load demands during current mission conditions. Each electrical load may be assigned a separate priority level, or multiple electrical loads may be assigned the same priority level depending on the particular application. The priority level assignment for each electrical load may be saved in the controller 318 such as by way of a memory (not shown) in operational communication with the controller 318. For instance, a priority level one (1) may be considered the highest priority, a priority level two (2) the second highest priority, and so forth. The controller 318 may, for example, formulate a pulse width modulated control signal based on the assigned priority levels and transmit the signals (e.g., via electrical interfaces) to the power conversion and distribution system 328, 344 for controlling the distribution of electrical power.

Various criteria may be used to determine the priority assignments, including but not limited to fuel efficiency parameters, transient load demands, electrical load demands depending on current mission conditions (e.g., take-off, aggressive maneuvers, acceleration, and/or other engine operations). Further, the controller 318 may determine the transient and electrical load demands based at least partially on aircraft operational parameters. For instance, parameters such as high and low pressure turbine rotational speed, engine thrust setting, altitude, speed, atmospheric pressure, and electrical system load may be used to determine the aircraft load requirements. The parameters may be supplied to the controller 318 via sensor and sensor systems (not shown) in the system 310. The electrical power may be distributed to the electrical loads based on their priority level ranking, for example, with the electrical load assigned the highest priority receiving all of the electrical power it requires, with the remaining electrical loads receiving either reduced electrical power or no power at all. Alternatively, the available electrical power may be shared among multiple electrical loads having the highest and second highest priority level, for example.

The controller 318 may manage the electrical power provided to the power bus 356, 358 by selectively activating and deactivating converter/distribution modules of the power conversion/distribution system 328, 344 depending on the priority level assigned to electrical loads. Lowest priority electrical loads, such as non-essential loads, may be turned off for a period of time to meet other (e.g., higher priority) electrical load demands. That is, the controller 318 may be configured to distinguish between essential and non-essential load demands in response to current mission conditions (e.g., take-off, certain maneuvers, acceleration, and/or other flight operations), and assign priority levels accordingly. The controller 318 may continually analyze system parameters, such as current mission conditions, aircraft operational parameters, transient load requirements, and/or fuel efficiency concerns, to produce the most current priority levels tier electrical load requirements. For example, the controller 318 may direct the power conversion/distribution system 328, 344 to provide more electrical power to hydraulic loads (e.g., electric pump receiving AC or DC current) during landing, high thrust, or maneuvering conditions than to some 400 Hz loads (e.g., TV screens, air conditioning). As such, the hydraulic loads may be assigned the highest priority level for a period of time.

The controller 318 may be configured to detect, via sensors, faults occurring within the power conversion/distribution system 328, 344 (e.g., signal failures) and coordinate with supplemental converter/distribution modules to segregate and accommodate for the fault by utilizing another converter/distribution module. For instance, the controller 318 may utilize a converter/distribution module of the power conversion and distribution system 344 to supply 270 V DC power to power bus 356 to meet current load demands. As such, the controller 318 may be configured to coordinate the various functional converter/distribution modules of the power conversion and distribution systems 328, 344 to provide for an integrated electrical energy distribution system.

The controller 318 may be configured to provide the platform with equipment and prognostic health monitoring information via the health monitoring and prognostics system 324, 340. The controller 318 may be in communication with one or more sensors and/or sensor systems configured to monitor one or more system 310 components. The sensors and/or sensor systems may be any type of sensor suitable for detecting/obtaining operational data from the system 310 components (e.g., accelerometers, position monitors, chemical gas sensors, pressure sensors, velocity sensors, magnetic sensors, humidity/moisture sensors, etc.). The controller 318 may provide real-time, in flight prognostics via measuring performance metrics (e.g., temperature, voltage, current, pressure, power) to predict degrading equipment, near failure, and useful life of the equipment. For instance, the controller 318 may collect sensor data to analyze against historical baseline and trend comparisons maintained in the database. The controller 318, via the sensors, may determine if equipment is in need of immediate or eventual service. Indeed, the controller 318 may be operable to coordinate the prognostic analysis with current mission objectives (e.g., high thrust conditions, certain maneuvering conditions) and, if necessary, trade component life for performance/capability.

The intelligent controller system 310, via the integrated controller 318, may manage energy (e.g., fuel, electrical and mechanical power, and thermal energy) efficiently across the platform. The controller 318 may prioritize the energy source for thermal and electrical demands and manage the distribution system accordingly. As such, the integrated control of multiple sub-systems may achieve superior efficiency of overall system 310 performance. Indeed, integrated control system 310 may be readily adaptable to a wide variety of performance requirements, thereby reducing the costs of unique power systems tailored for individual applications. Additionally, the integrated control system 310 may provide a standardized platform to insure interoperability of products/components from multiple vendors (e.g., Original Equipment Manufacturers).

Computing devices such as system 10 generally include computer-executable instructions such as the instructions of the system controller 18, where the instructions may e executable by one or more computing devices such as those listed above. Computer-executable instructions may be compiled or interpreted from computer programs created using a variety of programming languages and/or technologies, including, without limitation, and either alone or in combination, Java™, C, C++, C#, Objective-C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PLSQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An electrical power and thermal management system, comprising:
    a power plant operable to provide motive power to an electrical generation device;
    at least one conversion/distribution assembly configured to provide electrical power to a first electrical power bus;
    a thermal management system configured to circulate coolant to at least one heat source; and
    a controller in communication with the power plant, the electrical generation device, the conversion/distribution assembly, the electrical power bus, and the thermal management system, the controller configured to integrally manage electrical and thermal steady and transient demands, wherein the controller is operable to selectively distribute power to the electrical power bus and regulate produced thermal energy in response to electrical and thermal demands, respectively.

2. The system as claimed in claim 1, wherein the controller is configured to receive operational parameters representative of electrical load demands and manage the electrical loads in response to the operational parameters.

3. The system as claimed in claim 2, wherein the controller is configured to assign a priority level so that it is associated with a. plurality of electrical loads and formulate a pulse width modulated control signal based on the assigned priority levels, the controller operable to transmit the control signal to the conversion/distribution assembly for controlling the distribution of electrical power.

4. The system as claimed in claim 3, wherein the controller is configured to assign the priority levels based on at least one of transient load demands and electrical load demands responsive to operational parameters.

5. The system as claimed in claim 4, wherein the controller is configured to suppress electrical power distributed to the electrical load assigned with a lowest priority to meet higher priority demands.

6. The system as claimed in claim 3, wherein the controller is operable to control the amount of electrical power supplied to the first electrical power bus and selectively distribute electrical power to the electrical power bus via the conversion/distribution assembly in response to the load demands.

7. The system as claimed in claim 1, further comprising an energy storage system configured to absorb transient loads and selectively supply electrical power for electrical transients at the direction of the controller.

8. The system as claimed in claim 1, wherein the heat source includes at least one of the power plant, the electrical generation device, the conversion/distribution assembly, and an energy storage system.

9. The system as claimed in claim 8, wherein the controller is configured to manage the thermal energy generated by at least one heat source via at least one of:
- temporarily reduce electrical power distributed to the heat source to reduce heat produced from the heat source;
- increase coolant, via the thermal management system, in response to increased temperature to extract heat; and
- supply heat to and extract heat from the thermal management system in response to excess and deficient thermal energy, respectively.

10. The system as claimed in claim 1, further comprising a second electrical generation device in communication with the controller and the conversion/distribution assembly, wherein the conversion/distribution assembly is configured for variable power sharing between the first and second electrical generation devices to supply electrical power to a common electrical load at the direction of the controller.

11. The system as claimed in claim 1, wherein the controller is configured to increase output of the power plant to generate additional electrical power, via the electrical generation device, to supply to the electrical power bus, via the conversion/distribution assembly, to meet electrical load demands.

12. A turbine engine comprising:
- a compressor having a mid-compression station and an exit pressure station;
- a low pressure turbine and a high pressure turbine;
- an electrical system configured to supply power in parallel to a first electrical bus and a second electrical bus, the electrical system including:
  - a first electrical generation device coupled to the low pressure turbine;
  - a first conversion/distribution assembly coupled to the first electrical generation device operable to supply electrical power to a first electrical power bus;
  - a second electrical generation device coupled to the high pressure turbine;
  - a second conversion/distribution assembly coupled to the second electrical generation device operable to supply electrical power to a second electrical power bus;
  - a thermal management system configured to circulate coolant to at least one heat source;
  - an energy storage system configure to supply power to am absorb power from the first and second bus;
  - a controller configured to control operation of the turbine engine; and
  - a non-transitory computer readable medium, having instructions tangibly embodied thereon, the instructions being executable by a processor to instruct the controller to:
    - coordinate the electrical power supplied by the first generation device, second generation device, and energy storage system to the first and second power bus;
    - manage the amount of electrical power supplied to the first and second electoral bus in response to electrical load demands; and
    - direct the thermal management system to extract heat from the at least one heat source.

13. The turbine engine as claimed in claim 12, wherein the computer readable medium is configured to assign a priority level so that it is associated with a plurality of electrical loads and formulate a pulse width modulated control signal based on the assigned priority levels, the controller operable to transmit the control signal to the conversion/distribution assembly for controlling the distribution of electrical power.

14. The turbine engine as claimed in claim 13, wherein the computer readable medium is configured to assign the priority levels based on at least one of transient load demands and operational parameters representative of electrical load demands.

15. The turbine engine as claimed in claim 14, wherein the conversion/distribution assembly is operable, via the computer readable medium, to suppress electrical power distributed to the electrical load assigned with a lowest priority to meet higher priority demands.

16. The turbine engine as claimed in claim 12, wherein the computer readable medium is configured to selectively supply electrical power from the energy storage system for electrical transients and direct the energy storage system to absorb electrical transients from at least one of the first and second power bus.

17. The turbine engine as claimed in claim 12, wherein the computer readable medium is operable to manage the power output of the turbine engine, wherein the computer readable medium instructs the controller to transfer power between the low pressure and high pressure turbine, and increase electrical power supplied by at least one of the first and second electrical generation device via increasing the output of at least one of the low pressure and high pressure turbine, respectively.

18. The turbine engine as claimed in claim 12, wherein the controller is configured to deposit heat to and extract heat from the thermal management system in response to detecting excess and deficient thermal energy, respectively.

19. A method of operating a turbine engine comprising:
- driving a first and second electrical generation device via a first and second engine rotor shaft, respectively, such that the first and second electrical generation device provide variable power in parallel to a first and second power conversion/distribution system;
- controlling the amount of power extracted from the first and second generation device to supply power to a first and second electrical bus via the first and second power conversion/distribution system in response to transient and steady electrical demands;
- managing power provided to the first and second electrical bus in response to detected operational parameters representative of electrical load demands; and
- regulating produced thermal energy and circulating coolant to at least one heat source in response to increased operating temperatures.

20. The method as claimed in claim 19, further comprising directing an energy storage device to provide power to an absorb power from the first and second electrical bus.

* * * * *